United States Patent
Baeuerle

(10) Patent No.: US 7,131,408 B2
(45) Date of Patent: Nov. 7, 2006

(54) METHOD AND ARRANGEMENT FOR CONTROLLING AN INTERNAL COMBUSTION ENGINE

(75) Inventor: Michael Baeuerle, Ditzingen-Heimerdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/456,516

(22) Filed: Jun. 9, 2003

(65) Prior Publication Data
US 2004/0006986 A1    Jan. 15, 2004

(30) Foreign Application Priority Data
Jun. 7, 2002    (DE) ................. 102 25 305

(51) Int. Cl.
*F01L 1/34*    (2006.01)
(52) U.S. Cl. .............. 123/90.15; 123/90.12; 123/90.11; 251/129.1; 251/129.15; 251/129.16
(58) Field of Classification Search ............ 123/90.12, 123/90.15–90.18, 90.11, 90.24–90.27, 90.13, 123/90.14, 564; 251/129.1, 129.15, 129.16; 60/600–601
See application file for complete search history.

(56) References Cited

U.S. PATENT DOCUMENTS

| | | | | |
|---|---|---|---|---|
| 4,606,708 A * | 8/1986 | Clark | | 417/380 |
| 4,633,403 A * | 12/1986 | Asmus | | 701/105 |
| 4,878,464 A * | 11/1989 | Richeson et al. | | 123/90.11 |
| 5,117,790 A * | 6/1992 | Clarke et al. | | 123/321 |
| 5,123,388 A * | 6/1992 | Kanesaka | | 123/316 |
| 5,228,422 A * | 7/1993 | Wakeman | | 123/432 |
| 5,392,744 A * | 2/1995 | Regueiro | | 123/262 |
| 5,417,189 A * | 5/1995 | Regueiro | | 123/262 |
| 5,622,144 A * | 4/1997 | Nakamura et al. | | 123/90.15 |
| 5,765,528 A * | 6/1998 | Kamimaru | | 123/339.19 |
| 5,974,789 A * | 11/1999 | Mathes et al. | | 60/274 |
| 6,112,711 A * | 9/2000 | Shimizu et al. | | 123/90.16 |
| 6,502,546 B1 * | 1/2003 | Kawasaki et al. | | 123/399 |
| 6,564,758 B1 * | 5/2003 | Enderle et al. | | 123/64 |

FOREIGN PATENT DOCUMENTS

| | | |
|---|---|---|
| DE | 198 46 111 | 4/2000 |
| EP | 1083320 A2 * | 3/2001 |
| JP | 09209763 A * | 8/1997 |

OTHER PUBLICATIONS

Hatamura et al., JP09209763A (English Abstract),Aug. 1997.*

* cited by examiner

*Primary Examiner*—Thomas Denion
*Assistant Examiner*—Zelalem Eshete
(74) *Attorney, Agent, or Firm*—Walter Ottesen

(57) ABSTRACT

The invention is directed to a method and an arrangement for controlling an internal combustion engine (20) which achieve an optimal efficiency in different operating states. An opening time of an inlet valve (5) of a cylinder (1) of the engine (20) is variably adjusted. Depending upon an operating variable, especially the engine speed, two operating states of the engine (20) are distinguished. In a first operating state, during an intake operation, an opening of the inlet valve (5) is delayed. In a second operating state, a closing of the inlet valve is delayed and carried out during a compression operation.

15 Claims, 3 Drawing Sheets

METHOD AND ARRANGEMENT FOR CONTROLLING AN INTERNAL COMBUSTION ENGINE

BACKGROUND OF THE INVENTION

Internal combustion engines having fully variable valve controls are known, for example, in the form of an electro-hydraulic valve control.

Furthermore, German patent publication 198 46 111 discloses a method for increasing the torque of an internal combustion engine. The throttle flap in the intake manifold is closed at the beginning of an intake operation of the particular cylinder so that a post-charging effect, which increases the torque, occurs also at low engine speed. The throttle flap is again opened after a delay time. The delay time is so dimensioned that a pressure wave, which arises in the intake manifold because of the closing of the throttle flap, reaches one or several inlet valves present on the cylinder directly in advance of their closing and effects a post-charging of the cylinder.

Furthermore, the vehicle Eunos 800N is known, for example, from the Mazda Company which has an engine configured as a Miller engine. Here, the compression stroke of the engine is shortened wherefrom a low compression ratio and a high expansion ratio result.

SUMMARY OF THE INVENTION

Compared to the above, the method of the invention and the arrangement of the invention for controlling an internal combustion engine afford the advantage that two operating states of the engine are distinguished in dependence upon an operating variable, especially the engine speed. In a first operating state during an intake operation, an opening of the inlet valve is delayed and, in a second operating state, a closure of the inlet valve is delayed and is carried out during a compression operation. In this way, the engine can be optimally operated in different operating states with different requirements as to the opening time of the inlet valve. Accordingly, in a first operating state, an increased charge of the cylinder is realized without use of an auxiliary compressor. In the second operating state, a reduction of the effective compression and therefore an increased resistance to knocking and a lower exhaust-gas temperature can be realized especially at full load operation and therefore a higher degree of efficiency is realized.

The method of the invention is for controlling an internal combustion engine wherein the open time of an inlet valve of a cylinder of the internal combustion engine is variably adjusted. The method includes the steps of: distinguishing between two operating states of the engine in dependence upon an operating variable of the engine; delaying an opening of the inlet valve in a first one of the operating states during an intake operation; and, delaying a closing of the inlet valve in a second one of the operating states and executing the closing during a compression operation.

It is especially advantageous that a fresh air/fuel mixture, which is supplied to the engine, is compressed by means of an exhaust-gas turbocharger. With the exhaust-gas turbocharger, the effect of the post-charging of the cylinder because of a late opening of the inlet valve is amplified especially in the first operating state. In the second operating state, return losses because of the late closing of the inlet valve are compensated.

It is also advantageous that the pregiven threshold for the operating variable is so selected that the first operating state is a start-drive state. In this way, when using the engine speed as an operating variable, a possibly provided exhaust-gas turbocharger is supported by the above-described post-charging effect so that no unwanted start-drive weakness occurs. With this exhaust-gas turbocharger, there is, in the lowest rpm range, not the possibility of an adequate charging.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
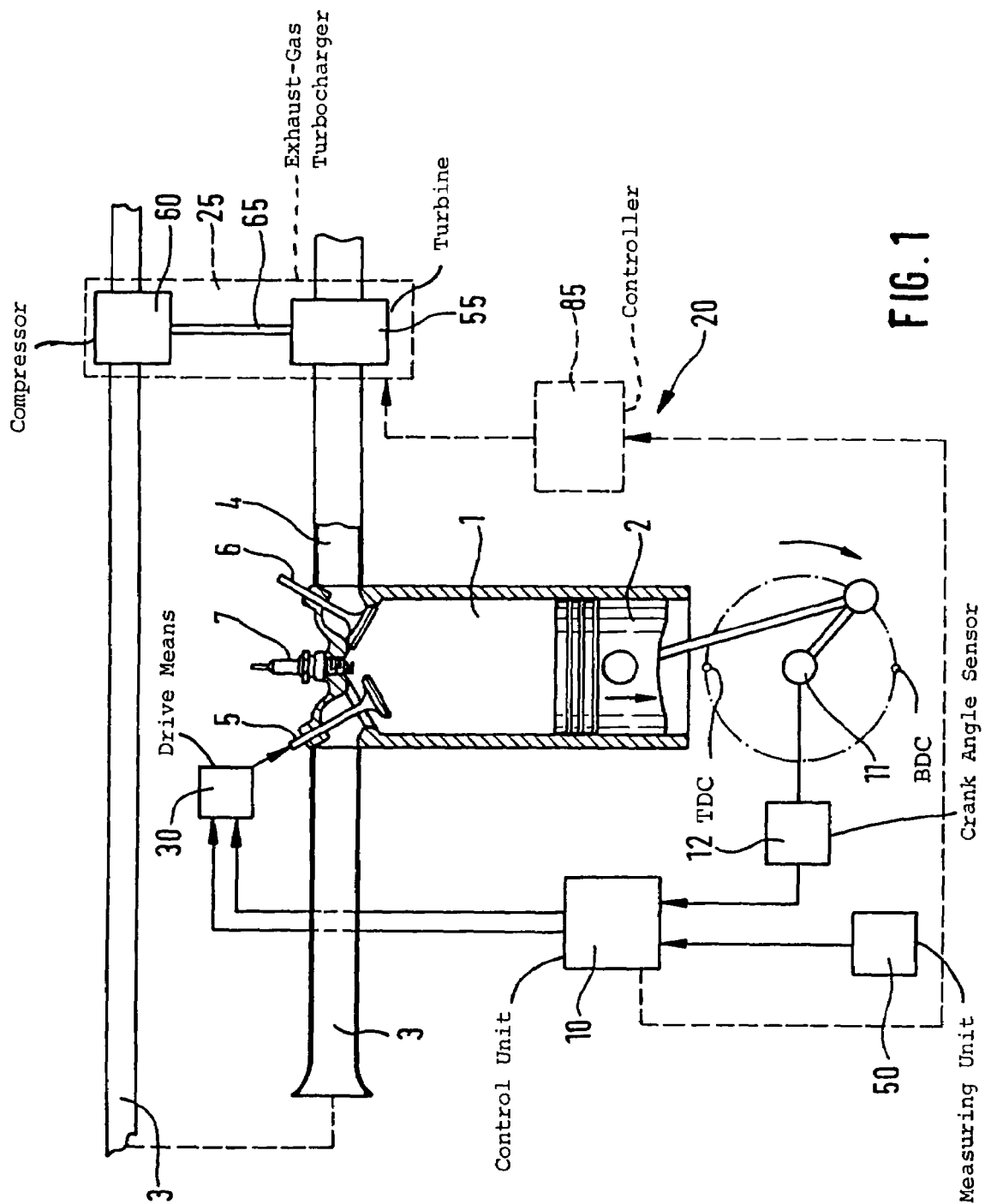
FIG. 1 is a schematic showing an internal combustion engine and an arrangement for controlling the engine according to the invention.

In FIG. 1, a cylinder 1 of an internal combustion engine 20 is shown with a piston 2 movable therein. The cylinder 1 has an inlet to an intake manifold 3 and an outlet to an exhaust-gas pipe 4. At least one inlet valve 5 is disposed in the inlet to the intake manifold 3 and at least one outlet valve 6 is arranged in the outlet to the exhaust-gas pipe 4 in the cylinder 1. Furthermore, a spark plug 7 is seated in the head of cylinder 1 and ignites the compressed air/fuel mixture in the cylinder 1. The position of a crankshaft 11, which is actuated by the piston 2, is detected by a crank angle sensor 12 and is supplied to a control 10 for controlling the internal combustion engine 20. The control 10 is identified in the following as a control unit. The control unit 10 can furthermore receive information via the crank angle sensor 12 as to the instantaneous position of the piston 2, that is, whether the piston 2 is disposed, for example, at top dead center (TDC) or at bottom dead center (BDC). A measuring unit 50 is also provided which measures the engine rpm as an operating variable of the internal combustion engine 20 and supplies the same to the control unit 10. The control unit 10 controls means for the variable setting of an opening time of the inlet valve 5. The means 30 then outputs a signal to the inlet valve 5 for opening or closing the same.

It can additionally be provided that a turbine 55 of an exhaust-gas turbocharger 25 is mounted in the exhaust-gas pipe 4. The turbine 55 is operated by the exhaust-gas mass flow in the exhaust-gas pipe 4 and is connected via a shaft 65 to a compressor 60 of the exhaust-gas turbocharger 25. The compressor 60 is driven by the turbine 55. The compressor 60 is mounted in the intake manifold 3 (that is, in the fresh mixture supply) and compresses the fresh mixture supplied to the cylinder 1 via the intake manifold 3.

Figure 3:
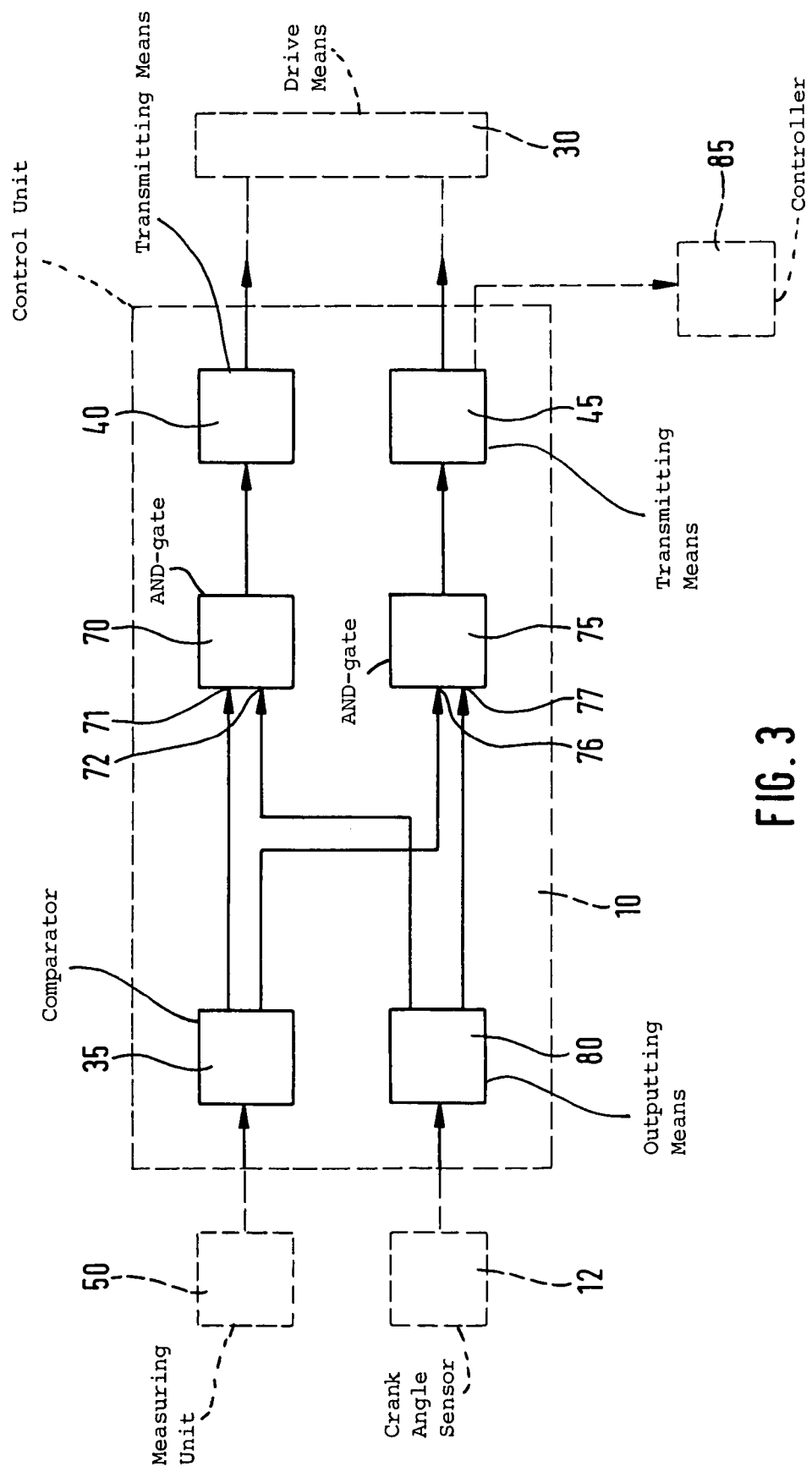
FIG. 3 is a block circuit diagram of an embodiment of the arrangement according to the invention.

According to FIG. 3, the control unit can be built up, for example, as follows. Means 35 for distinguishing two operating states of the internal combustion engine 20 are provided. The actual engine rpm is supplied by the measuring unit 50 to the means 35. The means 35 compare the instantaneous engine rpm to a pregiven threshold. If the instantaneous engine rpm lies below the pregiven threshold, then the means 35 recognize a first operating state, which in the following, is a start-drive state by way of example. If the means 35 detect the start-drive state, then a first input 71 of a first AND-gate 70 is set. Otherwise, the first input 71 of the first AND-gate 70 is reset. For the case that the means 35 determine that the instantaneous engine rpm is greater than or equal to the pregiven threshold, then the means 35 detect a second operating state of the internal combustion engine 20. In the second operating state, a full-load operation of the engine 20 is, for example, adjustable but also a part-load operation is adjustable. The pregiven threshold for the engine rpm can, for example, be set to 2,200 revolutions per minute. However, and depending upon the engine 20, also other values can be suitable for the pregiven threshold in order to distinguish the start-drive state from the second operating state. If the means 35 detect the second operating state, then a first input 76 of a second AND-gate 75 is set by the means 35. Otherwise, the first input 76 of the second AND-gate 75 is reset. The control unit 10 further includes means 80 for inputting the open time of the inlet valve 5. The instantaneous position of the crankshaft 11 and the instantaneous position of the piston 2 are supplied to the means 80 by the crank angle sensor 12. A first time point (that is, a first crank angle) for the opening of the inlet valve 5 is stored in the means 80 and, for the second operating state, a second time point (that is, a second crank angle) is stored in the means 80 for the closing of the inlet valve 5. At the first time point, the means 80 output a first set pulse to a second input 72 of the first AND-gate 70. At the second time point, the means 80 output a second set pulse to a second input 77 of the second AND-gate 75. During the first operating state, the first AND-gate 70 outputs the first set pulse to means 40 for delaying the opening time point of the inlet valve 5. Outside of the first operating state, the first AND-gate 70 outputs no signal to the means 40. In the second operating state, the second AND-gate 75 outputs the second set pulse to the means 45 for delaying a closure time point of the inlet valve 5. Outside of the second operating state, the second AND-gate 75 outputs no signal to the means 45. The output of the means 40 and of the means 45 is supplied to the means 30 for the variable setting of the opening time of the inlet valve 5. Here, it can be provided that the means 40 and the means 45 transmit the respective set pulses transparently to the means 30 or convert the respective pulses into a suitable drive signal for the means 30. With the respective set pulses (that is, the drive signal formed therefrom as may be required), the means 30 are advised as to when the inlet valve 5 is opened in the case of the first operating state and when the inlet valve 5 should be closed in the case of the second operating state. The means 30 then correspondingly drive the injection valve 5 in order to realize the opening time point of the inlet valve 5, which is provided for the first operating state, or the closing time point of the inlet valve 5 provided for the second operating state.

The opening time point, which is provided for the first operating state, is delayed relative to the opening time point of the inlet valve 5 which is usually used and the closing time point of the inlet valve 5 is likewise delayed in the second operating state relative to the closing time point usually used.

Figure 2:
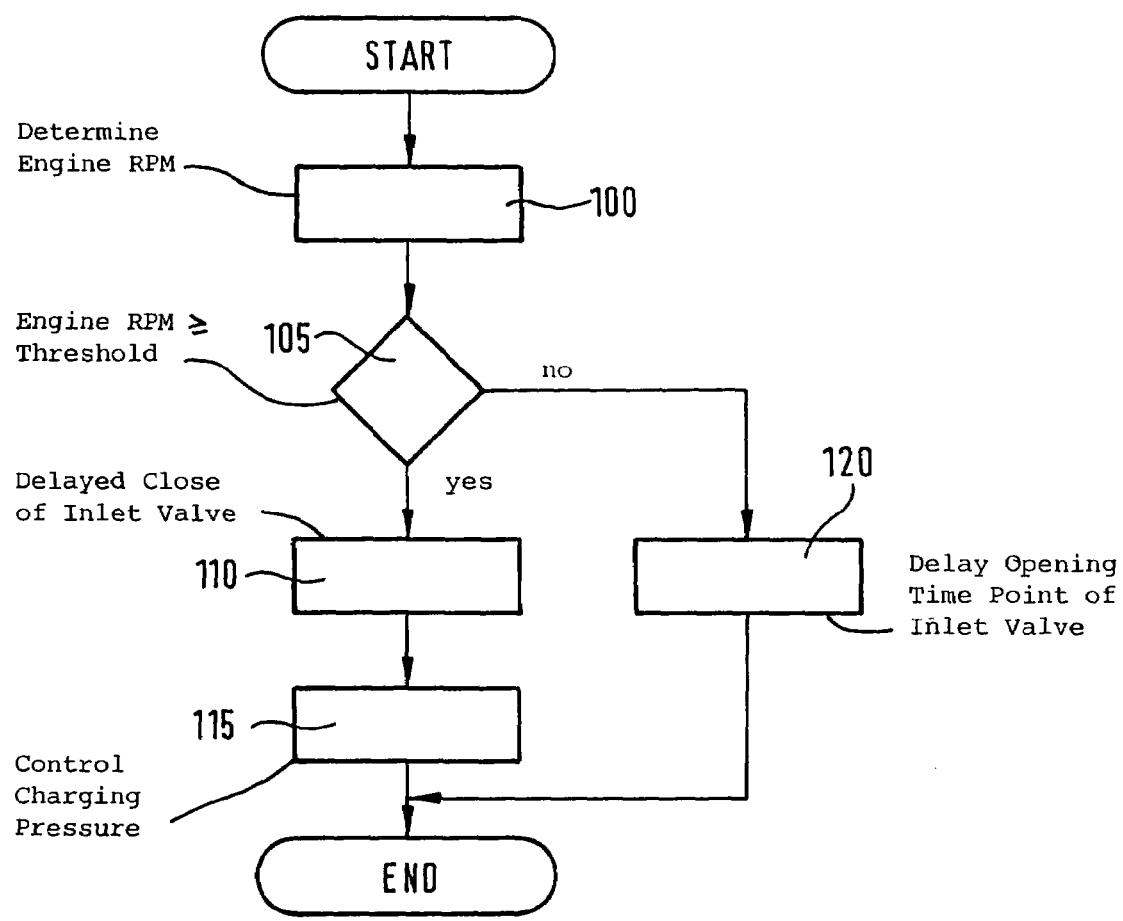
FIG. 2 is a flowchart showing the method of the invention.

The method of the invention will now be explained with respect to the flowchart shown in FIG. 2.

At a first program point 100, the means 35 determine the instantaneous engine rpm. Thereafter, the program branches to a program point 105. At program point 105, the means 35 check whether the instantaneous engine rpm is greater than or equal to the pregiven threshold. If this is the case, then the program branches to program point 110; otherwise, the program branches to program point 120. At program point 110, the means 35 cause, via the means 45, the means 30 to close the inlet valve 5 delayed. Thereafter, there is a movement out of the program or, optionally, the program branches to a program point 115. At program point 115, the control unit 10 causes a controller 85 of the exhaust-gas turbocharger 25 to control the charging pressure of the exhaust-gas turbocharger 25 in the second operating state in such a manner that the return losses are at least compensated during the compression operation. Such return losses occur in the second operating state with a delayed closure of the inlet valve 5 during the compression operation because the air/fuel mixture in the cylinder 1 is pushed back again into the intake manifold 3 through the inlet valve 5 which is still opened during the compression operation. The magnitude of the return losses is dependent upon the delay time up to the closure of the inlet valve. The return losses can be compensated by increasing the charging pressure of the exhaust-gas turbocharger 25. The charging pressure of the exhaust-gas turbocharger 25 can be controlled via a degree of opening of a bypass valve of a bypass switched in parallel to the turbine 55. The degree of opening of the bypass valve is controlled by the controller 85. The greater the degree of opening, the lower is the charging pressure. The smaller the degree of opening of the bypass valve, the greater is the charging pressure of the exhaust-gas turbocharger 25. The means 45 can determine the required charging pressure of the exhaust-gas turbocharger in dependence upon the closing time point provided for the second operating state in order to at least compensate the occurring return losses. The means 45 then output a corresponding control signal to the controller 85 in the form of a desired value for the charging pressure of the exhaust-gas turbocharger 25.

Thereafter, there is a movement out of the program. At program point 120, the means 35 cause, via the means 40 and the means 30, a delay of the opening time point of the inlet valve 5. Thereafter, there is a movement out of the program.

The variable setting of the opening time of the inlet valve 5 is determined by the opening time point and the closing time point thereof and can, for example, be realized with the aid of a so-called electro-hydraulic valve control. When the opening time point of the inlet valve 5 is selected to be delayed with respect to the usual opening time point as described (especially at a crank angle far after top dead center), then a great underpressure is generated in the cylinder 1. The late or delayed opening of the inlet valve 5 takes place during an intake operation of the fresh air/fuel mixture in the intake manifold 3 far after top dead center and in advance of bottom dead center. After the opening of the inlet valve 5, an increased acceleration of the inlet air column of the intake manifold 3 is generated thereby which thereafter is applied to the charging or post-charging of the cylinder 1 as a consequence of the kinetic energy stored in this inlet air column. Seen from an energy viewpoint, the suction work previously expended is converted into the charging work, as described, for example, in German patent publication 198 46 111 with respect to a control of the degree of opening of the throttle flap. In naturally aspirated engines, a charge increase results thereby in the cylinder 1 of, for example, approximately 15%. In an internal combustion engine 20 having turbocharging, as shown in FIG. 1, the possibility is not present to adequately charge with the exhaust-gas turbocharger 25 in the lowest engine rpm range which is characterized by the first operating state, that is, the start-drive state. Accordingly, a weakness of the start-drive occurs especially during the start-drive state. On the other hand, it is precisely in this engine rpm range that the smallest improvements in the supply of air or fresh air/fuel mixture to the engine 20 leads to a considerable increase of the engine torque because not only is the so-called spontaneous torque without contribution of the exhaust-gas turbocharger 25 higher but the response of the exhaust-gas turbocharger is also massively supported. In this way, the post-charging of the cylinder 1, which is effected by the delayed opening of the inlet valve 5, leads to a higher exhaust-gas mass flow whereby the turbine power of the turbine 55 of the exhaust-gas turbocharger 25 is increased. For this reason, the compressive power of the compressor 60 also increases. In this way, the charging pressure is increased and an increase of the fresh air/fuel mixture mass flow is effected in the intake manifold 3 which, in turn, leads to an increased charge of the cylinder 1 and therefore, in turn, to an increase of the exhaust-gas mass flow. For an engine rpm of approximately 1,000 revolutions per minute, measurements of this effect resulted in amplification values of the exhaust-gas turbocharger of up to approximately 2, that is, an increase of the fresh air/fuel mass flow by 10% because of a delayed opening of the inlet valve 5 leads to an approximately 200% higher fresh air/fuel mass flow while considering the exhaust-gas turbocharger 25 with a corresponding gain in the engine torque. On the basis of this realization, with the combination of the above-described post-charging with the exhaust-gas turbocharging in the lowest rpm range (that is, in the start-drive state), a charge improvement of up to approximately 30% can be expected when the amplification values of the exhaust-gas turbocharger 25 lie at approximately 2 as described above. This post-charging is also characterized as a pulse charging. The above corresponds to a theoretical engine torque improvement of approximately 25% in a spark-ignition engine or of approximately 30% in a diesel engine. These gains could thereafter become realized in a corresponding downsizing neutral as to torque so that, in a spark-ignition engine, a piston displacement reduction of approximately 25% appears to be realistic without driving disadvantages, that is, without a weakness in the start-drive state.

The high knock limiting in the full load range of turbochargers leads to the necessity of reducing the compression. However, this measure constitutes a compromise between part load requirements and full load requirements. In the part load range, because of the knock problem which is not present there, the requirement results to motorically optimally compress (for example, with a geometric compression ratio of 14) while, in the full load range, as a consequence of the knock limiting, significantly lower geometric compression ratios of, for example, 5 to 8, are optimal. A compromise solution for the geometric compression ratio could be provide for the geometric compression ratio of approximately the value 9 but would lead especially in the full load range to very modest degrees of efficiency because retarded ignition angles must be adjusted in order to limit knocking which would negatively influence the ignition angle degree of efficiency. The ignition angle degree of efficiency lies approximately between 80% and 95%. Furthermore, the retarded ignition angles lead to high exhaust-gas temperatures because the expansion stroke of the piston 2 cannot be optimally utilized and the centroid of the combustion is displaced toward retard. To protect the exhaust-gas conducting components, measures in the form of mixture enrichment up to approximately λ=0.75 are then necessary to limit the exhaust-gas temperature which, again, clearly reduces the degree of efficiency and leads to a fuel excess.

The solution of this problem is effected by the delay of the closing time point of the inlet valve 5 in the compression phase of the piston 2. The effective compression stroke is shortened by the delay of the closing time point of the inlet valve 5 and the air/fuel mixture is pushed back at least partially into the intake manifold 3. The geometric base compression ratio can be set here very high, for example, to the value 14. This geometric base compression ratio can be reduced to significantly lesser effective values in the second operating state, which includes also the knock-critical full-load range, so that a variable effective compression ratio can be adjusted.

Reduction of the effective compression is known as Miller cycle and is utilized, for example, in the state of the art mentioned initially herein for the Mazda Eunos 800N. A further advantage is an asymmetric compression/expansion ratio in the full-load range with the favorable characteristic that the exhaust-gas temperature drops by about approximately 100 K. The reason for this is a reduced expansion excess because of the high geometric compression ratio. Starting from the above-mentioned geometric base compression ratio, this compression ratio can be reduced in value from 14 to an effective value of, for example, 8 and, in contrast, the geometric expansion ratio can, for example, be unchanged at 14. With the reduced exhaust-gas temperature, the necessity for full-load enrichment is significantly reduced.

The return losses can be compensated in the described manner by a correspondingly raised charging pressure of the exhaust-gas turbocharger 25. In total, very significant advantages with respect to efficiency result from the Miller cycle in the part-load range as well as in the full-load range of the second operating state of the engine 20. A significant disadvantage of this Miller cycle is the significantly increased weakness in start-drive as a consequence of the inability of the exhaust-gas turbocharger 25 to compensate the return losses in the lower rpm range. Additionally, a delayed response performance of the exhaust-gas turbocharger 25 results because of the return losses. For this reason, the delay of the closing time point of the inlet valve 5 is provided only for the second operating state so that no Miller cycle is realized in the first operating state, that is, in the start-drive state. On the other hand, the delay of the opening of the inlet valve 5 can again be reversed in the second operating state because, in the second operating state, at rpms above the pregiven threshold, the exhaust-gas turbocharger exhibits an acceptable response performance and an acceptable charging performance.

In this way, and depending upon the operating state of the engine 20, the particular more favorable method is activated by the delay of the opening time point of the inlet valve or the delay of the closing time point thereof in order to achieve the best possible efficiency of the engine 20 in the particular operating state.

The geometric compression ratio and the geometric expansion ratio are identified by $\epsilon geo$ and are defined as follows:

$$\varepsilon geo = \frac{Vh + Vc}{Vc}$$

wherein: Vh is the piston displacement of the cylinder and Vc is the compression volume of the cylinder as described, for example, in German patent publication 198 46 111. The effective value for the geometric compression ratio and the geometric expansion ratio results as:

$$\varepsilon eff = \frac{Vl + Vc}{Vc}$$

wherein V1 is the cylinder volume starting with the beginning of the compression phase wherein the cylinder pressure increases above the intake manifold pressure. The start of the compression phase (between approximately 10° to 45° crank angle after bottom dead center) is fixed in dependence upon the control time and the engine rpm. In the Miller operation, the start of the compression phase is significantly later and V1 is less than Vh.

It is understood that the foregoing description is that of the preferred embodiments of the invention and that various changes and modifications may be made thereto without departing from the spirit and scope of the invention as defined in the appended claims.

What is claimed is:

1. A method for controlling an internal combustion engine wherein the open time of an inlet valve of a cylinder of said internal combustion engine is variably adjusted, the method comprising the steps of:
   distinguishing between two operating states of said engine in dependence upon an operating variable of said engine;
   delaying an opening of said inlet valve in a first one of said operating states during an intake operation;
   delaying a closing of said inlet valve in a second one of said operating states and executing said closing of said inlet valve at a closing time point during a compression operation;
   compressing an air/fuel mixture supplied to said engine utilizing an exhaust-gas turbocharger; and,
   determining the required charging pressure of said exhaust-gas turbocharger in said second operating state in dependence upon said closing time point of said inlet valve to at least compensate return losses which result during the compression operation.

2. The method of claim 1, comprising the further Step of detecting said first operating state when said operating variable lies below a pregiven threshold; and, detecting said second operating state when said operating variable lies above said pregiven threshold.

3. The method of claim 2, comprising the further step of so selecting said pregiven threshold that said first operating state is a start-drive state.

4. The method of claim 2, comprising the further step of so selecting said pregiven threshold so that a full-load operation is adjustable in said second state.

5. The method of claim 1, wherein said operating variable is the engine rpm.

6. An arrangement for controlling an internal combustion engine, the arrangement comprising:
   means for variably adjusting an open time of an inlet valve of a cylinder of said engine;
   means for distinguishing between two operating states of said engine in dependence upon an operating variable of said engine;
   means for delaying an opening of said inlet valve in a first one of said operating states during an intake operation;
   means for delaying a closing of said inlet valve in a second one of said operating states and executing said closing of said inlet valve at a closing time point during a compression operation;
   means for compressing an air/fuel mixture supplied to said engine utilizing an exhaust-gas turbocharger; and,
   means for determining the required charging pressure of said exhaust-gas turbocharger in said second operating state in dependence upon said closing time point of said inlet valve to at least compensate return losses which result during the compression operation.

7. The arrangement of claim 6, wherein said operating variable is the engine rpm.

8. A method for controlling an internal combustion engine wherein the open time of an inlet valve of a cylinder of said internal combustion engine is variably adjusted, the method comprising the steps of:
   distinguishing between two operating states of said engine in dependence upon the engine rpm of said engine;
   delaying an opening of said inlet valve in a first one of said operating states during an intake operation;
   delaying a closing of said inlet valve only in a second one of said operating states and executing said closing during a compression operation;
   detecting said first operating state when said engine rpm lies below a pregiven threshold; and,
   detecting said second operating state when said engine rpm lies above said pregiven threshold.

9. The method of claim 8, comprising the further step of compressing an air/fuel mixture supplied to said engine utilizing an exhaust-gas turbocharger.

10. The method of claim 8, comprising the further step of controlling the charging pressure of said exhaust-gas turbocharger in said second operating state so that return losses are at least compensated during the compression operation.

11. The method of claim 8, comprising the further step of selecting said pregiven threshold so that a full-load operation is adjustable in said second state.

12. The method of claim 8, wherein said operating variable is the engine rpm.

13. The method of claim 8, wherein a first operating state results in a delay of the opening of said inlet valve.

14. An arrangement for controlling an internal combustion engine, the arrangement comprising:
   means for variably adjusting an open time of an inlet valve of a cylinder of said engine:
   means for distinguishing between two operating states of said engine in dependence upon the engine rpm of said engine;
   means for delaying an opening of said inlet valve in a first one of said operating states during an intake operation;
   means for delaying a closing of said inlet valve only in a second one of said operating states and executing said closing during a compression operation;
   means for detecting said first operating state when said engine rpm lies below a pregiven threshold; and,
   means for detecting said second operating state when said engine rpm lies above said pregiven threshold.

15. The arrangement of claim 14, wherein a first operating state results in a delay of the opening of said inlet valve.

* * * * *